US011313765B2

(12) United States Patent
Onekea et al.

(10) Patent No.: US 11,313,765 B2
(45) Date of Patent: Apr. 26, 2022

(54) SYSTEMS AND METHODS FOR REMOTE VISUAL INSPECTION AND EMISSIONS TESTING OF VEHICLES

(71) Applicant: Toyota Connected North America, Inc., Plano, TX (US)

(72) Inventors: Jeremy J. Onekea, Plano, TX (US); Darren K. Masumori, Richardson, TX (US); Randall M. Harris, Dallas, TX (US)

(73) Assignee: Toyota Connected North America, Inc., Plano, TX (US)

( * ) Notice: Subject to any disclaimer, the term of this patent is extended or adjusted under 35 U.S.C. 154(b) by 170 days.

(21) Appl. No.: 16/255,406

(22) Filed: Jan. 23, 2019

(65) Prior Publication Data

US 2020/0232884 A1 Jul. 23, 2020

(51) Int. Cl.
| | | |
|---|---|---|
| *G01M 17/007* | (2006.01) | |
| *G01M 15/10* | (2006.01) | |
| *G06T 7/00* | (2017.01) | |
| *G06K 9/62* | (2022.01) | |
| *H04N 5/445* | (2011.01) | |
| *G06K 9/00* | (2022.01) | |

(52) U.S. Cl.
CPC ........ *G01M 17/007* (2013.01); *G01M 15/102* (2013.01); *G06K 9/00671* (2013.01); *G06K 9/6215* (2013.01); *G06T 7/0002* (2013.01); *H04N 5/44504* (2013.01); *G06K 2209/23* (2013.01)

(58) Field of Classification Search
None
See application file for complete search history.

(56) References Cited

U.S. PATENT DOCUMENTS

| | | | |
|---|---|---|---|
| 6,604,033 B1 | 8/2003 | Banet et al. | |
| 6,879,894 B1 | 4/2005 | Lightner et al. | |
| 7,774,111 B2 | 8/2010 | Oesterling et al. | |
| 8,214,100 B2 | 7/2012 | Lowrey et al. | |
| 10,055,906 B1 * | 8/2018 | Fournier | G07C 5/0841 |
| 10,552,810 B1 * | 2/2020 | Ethington | G06Q 20/042 |

(Continued)

FOREIGN PATENT DOCUMENTS

| | | |
|---|---|---|
| CN | 103256109 B | 4/2015 |
| CN | 105604664 B | 5/2016 |

*Primary Examiner* — Kaitlin A Retallick
(74) *Attorney, Agent, or Firm* — Dinsmore & Shohl LLP

(57) ABSTRACT

A vehicle certification system includes an emissions sensor configured to capture emissions data of a subject vehicle, a local computing system that includes a processor and a non-transitory computer readable memory, an imaging device communicatively coupled to the processor, a display communicatively coupled to the processor, and a machine-readable instruction set stored in the non-transitory computer readable memory that, when executed by the processor, causes the local computing system to capture image data of the subject vehicle, and a remote server that is configured to receive the emissions data captured by the emissions sensor, determine compliance with at least one emissions criterion based on the emissions data, receive the image data of the subject vehicle captured by the local computing system, and determine compliance with at least one visually verifiable inspection criterion based on the image data.

19 Claims, 7 Drawing Sheets

(56) References Cited

U.S. PATENT DOCUMENTS

| | | | |
|---|---|---|---|
| 2003/0185340 A1* | 10/2003 | Frantz | G01N 21/8806 378/57 |
| 2006/0114531 A1* | 6/2006 | Webb | G01N 21/8851 359/15 |
| 2013/0246135 A1 | 9/2013 | Wang | |
| 2014/0240349 A1* | 8/2014 | Tuukkanen | G06F 3/0484 345/633 |
| 2014/0313334 A1* | 10/2014 | Slotky | G01N 21/9515 348/148 |
| 2016/0019730 A1 | 1/2016 | Tripathi | |
| 2016/0129638 A1* | 5/2016 | Bostick | B33Y 50/00 700/98 |
| 2017/0186247 A1* | 6/2017 | Thorley | G07C 5/0825 |

\* cited by examiner

SYSTEMS AND METHODS FOR REMOTE VISUAL INSPECTION AND EMISSIONS TESTING OF VEHICLES

TECHNICAL FIELD

The present specification generally relates to vehicle inspections and, more specifically, systems and methods for remote visual inspection and emissions testing of vehicles.

BACKGROUND

In order to meet various jurisdictional requirements, vehicles may require routine inspections of their emissions system and other vehicle systems (e.g., headlights, turn signals, etc.). In some instances, these routine inspections may be performed by inspectors licensed by the various jurisdictions requiring the physical colocation of the vehicle that is to be inspected and the licensed inspector. However, a user of a vehicle may desire to have his or her vehicle inspected without physically meeting an inspector or visiting an inspection site. Accordingly, systems and methods for remote visual inspection and emissions testing of vehicles are desired.

SUMMARY

In one embodiment, a vehicle certification system includes an emissions sensor configured to capture emissions data of a subject vehicle, a local computing system that includes a processor and a non-transitory computer readable memory, an imaging device communicatively coupled to the processor, a display communicatively coupled to the processor, and a machine-readable instruction set stored in the non-transitory computer readable memory that, when executed by the processor, causes the local computing system to capture image data of the subject vehicle, and a remote server that is configured to receive the emissions data captured by the emissions sensor, determine compliance with at least one emissions criterion based on the emissions data, receive the image data of the subject vehicle captured by the local computing system, and determine compliance with at least one visually verifiable inspection criterion based on the image data.

In another embodiment, an augmented reality system includes an emissions sensor configured to capture emissions data, a local computing system having a processor and a non-transitory computer readable memory, an imaging device communicatively coupled to the local computing system, a display communicatively coupled to the local computing system, and a machine-readable instruction set stored in the non-transitory computer readable memory that causes the augmented reality system to perform at least the following when executed by the processor: capture the emissions data with the emissions sensor, compare the emissions data to a jurisdictional requirement, determine compliance with at least one emissions criterion based on the comparison between the emissions data and the jurisdictional requirement, capture an image of a subject vehicle with the imaging device, compare the image of the subject vehicle to a library of images of satisfactory vehicle conditions, and determine a similarity value for the image of the subject vehicle, wherein the similarity value defines a similarity between the image of the subject vehicle and one or more images in the library of images of satisfactory vehicle conditions.

In yet another embodiment, a method of determining whether a subject vehicle has satisfied at least one visually verifiable inspection criterion includes receiving emissions data and image data at a remote server, wherein the image data comprises image data of one or more features of the subject vehicle captured by a local computing system comprising an imaging device, determining whether the subject vehicle has satisfied at least one emissions criterion based on the emissions data, and determining whether the subject vehicle has satisfied at least one visually verifiable inspection criterion based on the image data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
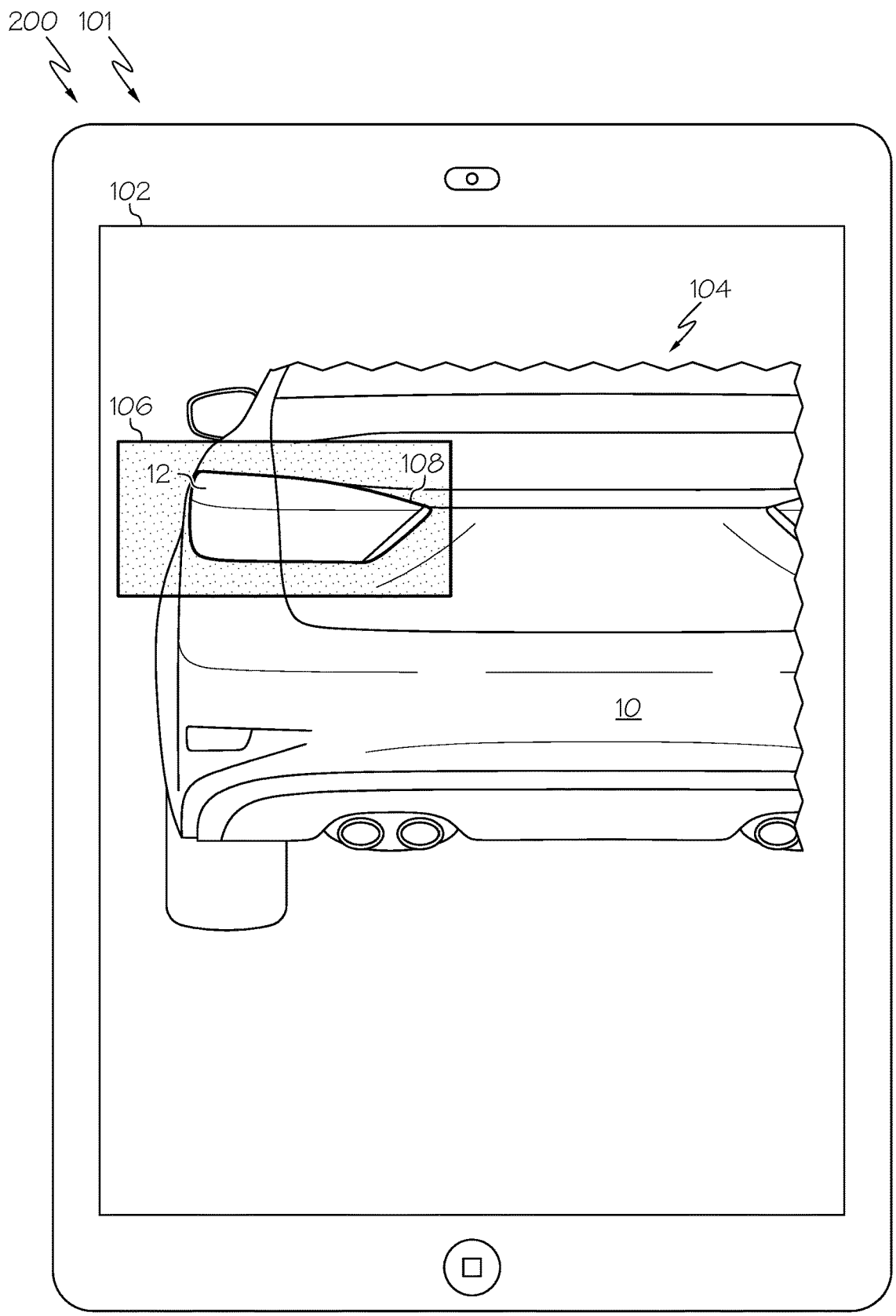
FIG. 1 depicts an illustrative embodiment of an augmented reality overlay presented on a display device according to one or more embodiments shown and described herein.

Vehicles may require inspections in order to maintain a license or registration to legally operate in a given jurisdiction. Embodiments described herein are directed to systems for remote testing of emissions and systems of vehicles. These systems may facilitate the testing of vehicles without requiring an inspector and the vehicle to be co-located (e.g., without requiring a vehicle to visit an inspection facility). Described embodiments enable vehicle certification to be performed remotely based on diagnostic data transmitted from a vehicle using a telematics system or other communication system to an inspector or other certified entity capable of verifying that a subject vehicle meets jurisdictional requirements and certifying the vehicle to be within such requirements. In some embodiments, the inspector may be a remote server. The inspector may compare diagnostic data (e.g., emissions data, image data, etc.) with jurisdictional requirements to evaluate compliance with licensing, registration, and/or certification requirements.

In some embodiments, a telematics system may continuously transmit diagnostic data, including, for example, trouble codes, sensed vehicle parameters, and the like to a remote server. The transmitted diagnostic data may be processed in order to determine whether the vehicle satisfies emissions requirements. The remote server may continually monitor the emissions compliance of the vehicle and provide a notification to the owner of the vehicle (e.g., via a message displayed in a head unit, an SMS text message, a notification of an app on the owner's phone, an email, a telephone call, or the like) in response to determining that the vehicle is out of compliance with emissions requirements. In some embodiments, diagnostic data trends may be monitored in order to predict when a vehicle may fail standards. Some embodiments may only transmit the emissions data to the remote site in response to a query from the remote site, or in response to a user requesting that the data be sent to the remote site. In some embodiments, the emissions standards may be tested continuously or periodically at the vehicle, and the vehicle may only send data externally when and if the vehicle no longer meets standards. In some embodiments, diagnostic data may be compared to one or more standards in the form of one or more data tables and/or automated inspection applications such that an inspector is not required to be physically present in order to verify the data and may not be required to verify the data at all.

Image and/or video data may be captured at the vehicle and transmitted to a remote server for evaluation of physical aspects of the vehicle relevant to vehicle certification, such as, for example, tire tread depth, blinker operation, windshield wiper operation, etc. The remote server may process the image data and determine if such physical parameters satisfy requirements necessary for passing a certification test.

Diagnostic data may be transmitted from the remote server to a compliance monitoring authority for the particular jurisdiction or diagnostic data may be sent directly to the compliance monitoring authority. In some embodiments, diagnostic data may be evaluated at the remote server. Various criteria for diagnostic data transmission are considered. For example, such transmission may occur continuously, at a prescheduled time, in response to a query from the compliance monitoring authority, in response to a request from the user for the data to be sent to the compliance monitoring authority, etc.

In some embodiments, diagnostic data may only be sent based on the authorization of a user. For example, a user may provide authorization to send diagnostic data to the remote server and/or to a compliance monitoring authority. In some embodiments, a user may opt to transmit diagnostic data automatically. For example, when the user activates telematics services, he or she may opt to transmit diagnostic data. In embodiments, the user may be prompted (e.g., via a prompt on the head unit, a prompt delivered via a mobile application, etc.) each time diagnostic data is shared, such as on a schedule related to when emissions compliance must be renewed.

Some embodiments may track emissions compliance status and due dates. For example, in some embodiments, a local computing system may be updated when an emissions certification is received from the compliance monitoring authority. In some embodiments, a local computing system may maintain a maintenance and/or diagnostic calendar and provide timely reminders of when the next emissions test must be completed.

Certain embodiments disclosed herein may include augmented reality systems and methods configured to determine whether a vehicle meets inspection requirements based on recording image data of at least one visually verifiable inspection criterion using an augmented reality system. The image data may be displayed to an inspector for further investigation. Generally, these systems and methods utilize an imaging device, a display, and image processing algorithms to overlay an augmented reality portion over an image of the inspection vehicle on a display in order to guide a user, (e.g., an owner of the vehicle, an inspector, etc.) through an inspection process. In some embodiments, the augmented reality system may use an imaging device to capture images, compare the captured images to a library of images of one or more portions of satisfactory vehicles, and to identify portions of the captured images that do not match satisfactory vehicles. As discussed in more detail herein, the display may include a wearable or handheld device such as, for example, augmented reality glasses, a smartphone, or a tablet-computing device. Using the imaging device and display, a user may image portions of a vehicle with the imaging device and receive through the display an augmented reality view of the vehicle that identifies features of the vehicle that need to be imaged for an inspection (e.g., tail lights, sideview mirrors, etc.). In some embodiments, these features include dynamic inspection features (e.g., tail light activation, windshield wiper activation, etc.).

The identification of one or more non-compliant features of the vehicle through an augmented reality view may allow an inspector to more conveniently identify static and dynamic features of the vehicle to reduce the time needed for inspection or allow a lay user (e.g., someone who is not a certified inspector) to capture images of a vehicle and to have their inspection completed without physically locating their vehicle at an inspection location. Because the systems and methods described herein include both emissions testing systems and visual inspection systems, it may be possible for a user to never need to be physically present at an inspection location. This may save users of vehicles time, effort, and money. Accordingly, systems and methods for remote visual inspection and emissions testing of vehicles are desired.

Turning now to the drawings wherein like numbers refer to like structures, and particularly to FIG. 1, a local computing system 101 including a display 102 presenting an image 104 of a rear left side of a subject vehicle 10 is depicted. An augmented reality overlay including an augmented reality portion 106 is overlaid with the image 104. The augmented reality portion 106 is an interactive portion overlaid over a real time image of the subject vehicle 10 that augments the real time image with computer-generated perceptual information that is additive to the real time image. The augmented reality portion 106 may be a semi-transparent display overlay that can align with the one or more inspection features as displayed on the display 102 as will be described in greater detail herein. Computer-generated perceptual information may help guide a user of the local computing system 101 through a series of image requirements in order to capture a series of images. The series of images may be used as certification criteria in a visual inspection of the subject vehicle 10 (e.g., in a visual inspection as required by a particular jurisdiction).

In the particular example embodiment shown in FIG. 1, the augmented reality portion 106 is configured to align with the left tail light of the subject vehicle 10. The image 104 that is displayed may be a live image captured by the imaging device or may be a previously captured image that is presented on the display 102 for review by an inspector. In either instance, the augmented reality portion 106 generated by the augmented reality inspection system, which will be described in more detail herein, tracks the portion of the subject vehicle (e.g., a component or structural feature) that is to be imaged based on a library of images of vehicles similar to the subject vehicle 10.

Figure 2:
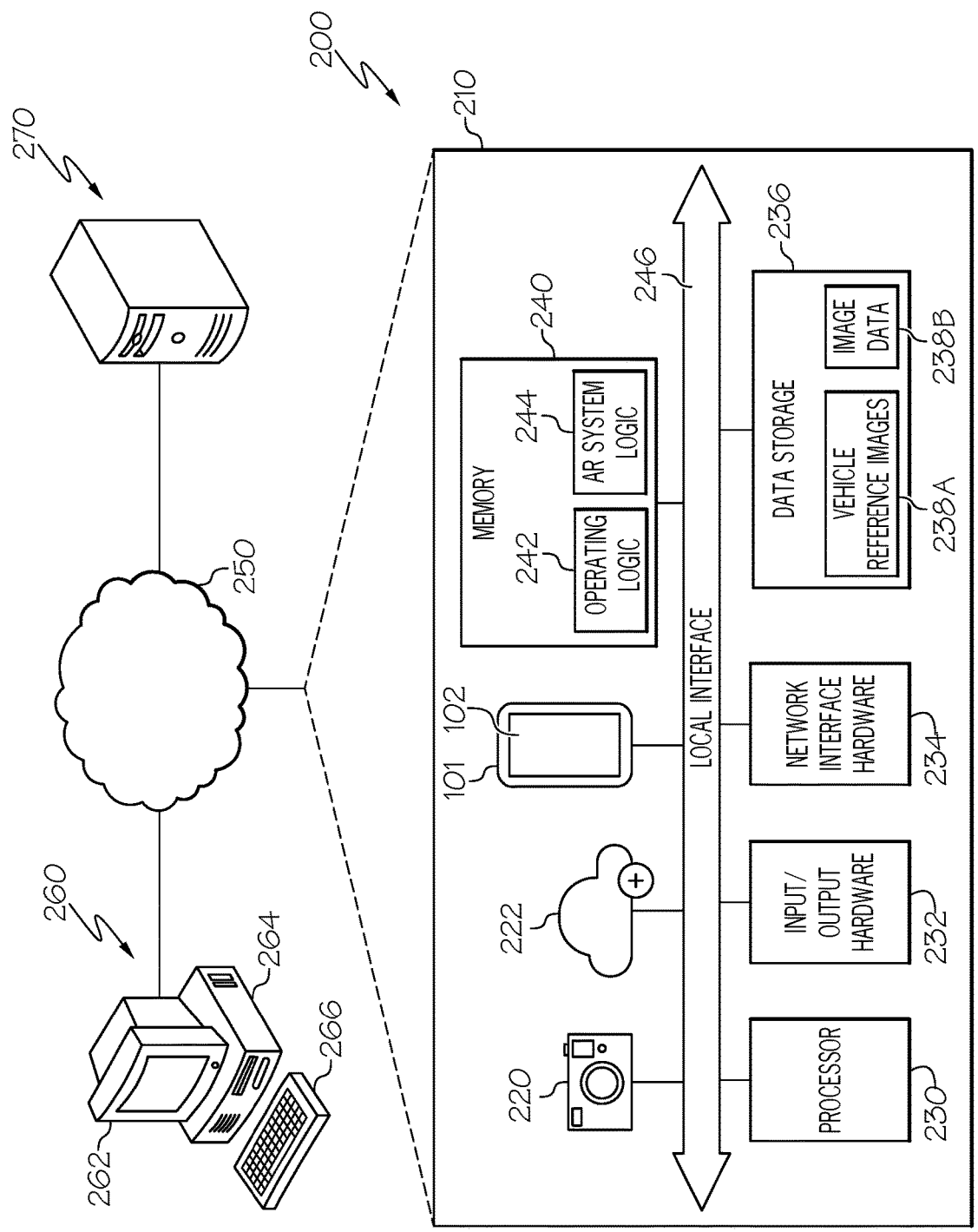
FIG. 2 schematically depicts components of an augmented reality inspection system according to one or more embodiments shown and described herein.

Referring now to FIG. 2, a vehicle certification system 200 including an augmented reality inspection system 210 and an emissions testing module 222 is depicted. The augmented reality inspection system 210 generally includes an imaging device 220, a display 102, a processor 230, input/output hardware 232, network interface hardware 234, a data storage component 236, a memory component 240, and the emissions testing module 222. A local interface 246 may also be implemented as a bus or other interface to facilitate communication among the components of the augmented reality inspection system 210. The augmented reality inspection system 210 may be connected to a network 250, a remote computing device 260, and/or a remote server 270.

The vehicle certification system 200 may be used to verify one or more inspection features or visually verifiable features of a vehicle such as the subject vehicle 10. The inspection features and visually verifiable features may be static features or dynamic features. Briefly referring to FIG. 1, an example inspection feature is shown. The inspection feature in FIG. 1 is a static feature 12. The static feature 12 in this particular example is a rear left taillight of the subject vehicle 10. It may be necessary, for example, to verify that the rear left taillight is installed and intact. Briefly referring to FIGS. 3A and 3B, another inspection feature, in this case, a dynamic feature 14 is shown. The dynamic feature 14 is a change from a dim light condition to a bright light condition. It may be necessary, for example, to verify that the headlights of a vehicle such as the subject vehicle 10 can change from a dim condition to a bright condition. Accordingly, such a visually verifiable feature may be verified using the vehicle certification system 200. Briefly referring to FIGS. 4A and 4B, a second example dynamic feature 16 is shown. The second dynamic feature 16 is a change in position of a windshield wiper. It may be necessary, for example, to verify that windshield wipers can move from a base position to an extended position on the windshield. Accordingly, such a visually verifiable feature may be verified using the vehicle certification system 200. It is to be understood that these three examples of static and dynamic features are merely examples and that other visually verifiable features are considered. For example, an inspection checklist may include any number of visual checks to include, but not limited to tire tread depth, fluid level checks, suspension checks, pressure checks, windshield crack checks, etc.

The imaging device 220 may be any device having an array of sensing devices (e.g., a CCD array, active pixel sensors, and the like) capable of detecting radiation in an ultraviolet wavelength band, a visible light wavelength band, or an infrared wavelength band. The imaging device 220 may have any resolution. The imaging device 220 may be an omni-direction imaging device or a panoramic imaging device. In some embodiments, one or more optical components, such as a mirror, fish-eye lens, or any other type of lens may be optically coupled to the imaging device 220. It should be understood that where the imaging device 220 or other systems described herein are described with respect to "image data" or an "image," such language encompasses "video data" or a "video." The imaging device 220 may be incorporated with the display 102, for example, as components of a tablet computer, a smartphone, wearable glasses or the like. The imaging device 220 may also be a standalone device.

The display 102 of the augmented reality inspection system 210 may be any device capable of visually displaying images captured by the imaging device 220 and an augmented reality overlay. The display 102 may include any medium capable of transmitting an optical output such as, for example, a cathode ray tube, light emitting diodes, a liquid crystal display, a plasma display, or the like. Moreover, the display 102 may be a touchscreen that, in addition to providing optical information, detects the presence and location of a tactile input upon a surface of or adjacent to the display 102. Accordingly, the display 102 may receive mechanical input directly upon the optical output provided by the display 102. Additionally, it is noted that the display 102 can include at least one processor 230 and memory component 240. For example, the display 102 may be a tablet computer, a smartphone, a lens or other display component in a pair of augmented reality glasses, or the like.

The processor 230 may include any processing component(s) configured to receive and execute programming instructions (such as from the data storage component 236 and/or the memory component 240). The instructions may be in the form of a machine-readable instruction set stored in the data storage component 236 and/or the memory component 240 (e.g., one or more programming instructions). Accordingly, the processor 230 may be an electric controller, an integrated circuit, a microchip, a computer, or any other computing device. The processor 230 is communicatively coupled to the other components of the augmented reality inspection system 210 through the local interface 246 and/or the network interface hardware 234. Accordingly, the local interface 246 may communicatively couple any number of processors 230 with one another, and allow the components coupled to the local interface 246 to operate in a distributed computing environment. In some embodiments, the local interface 246 is a CAN bus. Each of the components may operate as a node that may send and/or receive data. Furthermore, while the embodiment depicted in FIG. 2 includes a single processor 230, some embodiments may include more than one processor 230.

The input/output hardware 232 may include a monitor, keyboard, mouse, printer, imaging device, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with a network 250 and/or other devices and systems.

The data storage component 236 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The data storage component 236 may reside local to and/or remote from the augmented reality inspection system 210 and may be configured to store one or more pieces of data for access by the augmented reality inspection system 210 and/or other components.

As illustrated in FIG. 2, the data storage component 236 stores, for example, vehicle reference images 238A and image data 238B. The vehicle reference images 238A may include a library of images of vehicles and vehicle features that may be used to compare to the real time images of the subject vehicle 10 during inspection. It is to be understood that reference herein to "images" or "image data" also includes series of images or image data that may be referred to as "video" or "video data." The library of images may include images of vehicles or vehicle features that are in an acceptable condition (i.e., in a condition that could pass inspection). In some embodiments, the library of images may include images of vehicles or vehicle features that are or are not in an acceptable or satisfactory condition (i.e., could not pass inspection). The images may be classified into a sub-group of images by make, model, trim package, or the like. The library of images may also include images of known vehicle configurations having aftermarket components or changes to structural features.

The library of images may be used to develop baseline image data that may be compared against actual vehicle images during an inspection of the subject vehicle 10. For example, the subject vehicle 10 may be compared to baseline image data or a sub-group of baseline image data. The sub-group of baseline image data may be based on, for example, a make, model, class, type, or other classification or feature or group of features of the subject vehicle 10. In some embodiments, the library of images may be used to develop baseline image data of a certifiable vehicle condition and the subject vehicle 10 may be compared to this data to determine whether the subject vehicle 10 satisfies one or more visually verifiable inspection criterion as will be described in greater detail herein. In some embodiments, the subject vehicle 10 may be compared to a library of images of satisfactory vehicle conditions.

In some embodiments, the vehicle reference images 238A may include design specifications such as dimensions, colors, configurations, etc. ("design aspects") for particular vehicle makes, models, and/or trim packages. The design aspects may also be defined by rules and regulations. As described in more detail herein, design aspects may be extracted from images captured of the subject vehicle by the imaging device 220 and may be compared to the design aspects stored in the vehicle reference images 238A in the data storage component 236.

The data storage component 236 may further include image data 238B that is captured by the imaging device 220. The image data 238B may be captured by the imaging device 220 and stored in the data storage component 236. In some embodiments, the image data 238B that is captured by the imaging device 220 may be transmitted through a network 250 to a data storage component 236 that is located at a remote location from the augmented reality inspection system 210.

The memory component 240 may be machine-readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and augmented reality inspection logic 244 ("AR Logic"), each of which may be embodied as a computer program, firmware, or hardware, as an example, and will be described in more detail herein.

The operating logic 242 may include an operating system and/or other software for managing components of the augmented reality inspection system 210. The AR logic 244 may include logic specific to carrying out functions of the augmented reality inspection system 210, for example, which will be described in more specific detail with respect to FIGS. 5 and 6.

Still referring to FIG. 2, it should be understood that the augmented reality inspection system 210 may be communicatively coupled to a network 250, a remote computing device 260, and/or a remote server 270. The network 250 may include a wide area network, such as the internet, a local area network (LAN), a mobile communications network, a public service telephone network (PSTN) and/or other network. The remote computing device 260 may include a display 262, a processing unit 264 and an input device 266, each of which may be communicatively coupled together and/or to the network 250. The remote computing device 260 may be used to interface with a front-end application, which may provide control and/or interaction with the augmented reality inspection system 210. In some embodiments, one or more remote computing devices 260 may be implemented so that one or more users may interact with the augmented reality inspection system 210.

Additionally, a remote server 270 may be communicatively coupled through the network 250 to the augmented reality inspection system 210. The remote server 270 may provide processing resources, data storage, administrator supervision or the like to the augmented reality inspection system 210.

It should be understood that while the remote computing device 260 and the remote server 270 are depicted as personal computers and a server, respectively, these are merely examples. More specifically, any type of computing device (e.g., mobile computing device, personal computer, server, and the like) may be utilized for any of these components. Additionally, while each of these computing devices and the augmented reality inspection system 210 is illustrated in FIG. 2 as a single piece of hardware, this is also an example. More specifically, each of the remote computing device 260, the remote server 270, and the augmented reality inspection system 210 may represent a plurality of computers, servers, databases, and the like operating in a distributed computing configuration to form the augmented reality inspection system 210.

Still referring to FIG. 2, the emissions testing module 222 may be used to determine whether or not the subject vehicle 10 meets a standardized emissions standard or not. In some embodiments, the emissions testing module 222 may receive inputs from one or more sensors configured to measure the hydrogen (H), water ($H_2O$), carbon dioxide ($CO_2$), carbon monoxide (CO), fuel, and/or other constituent ratios of the exhaust of the subject vehicle 10. The emissions gases may be measured by one or more instruments (e.g., a Fourier transform infrared analysis (FTIR) sensor). In some embodiments, an output of the emissions testing module 222 may be based on one or more signals received from an on-board diagnostic system (e.g., OBDII) or other diagnostic system that may be connected to the local interface 246 or otherwise communicatively coupled to the emissions testing module 222. In some embodiments, the emissions testing module 222 may receive one or more inputs from an engine control system or similar system that controls the engine. The emissions testing module 222 may cause the continuous or routine testing of vehicle emissions. In some embodiments, the emissions may be tested randomly or at the demand of an inspector or a certifying body (e.g., a jurisdiction such as a U.S. state, county, or municipality, or foreign jurisdiction, principality, region, etc.). Although the emissions testing module 222 is shown as a component in the augmented reality inspection system 210, it is to be understood that the emissions testing module 222 may be separate or remote from and communicatively coupled with the augmented reality inspection system 210.

Referring again to FIG. 1, an exemplary use of one or more components of the vehicle certification system 200 to inspect a static feature of the subject vehicle 10 is described. The local computing system 101 is shown aiming a camera (such as the imaging device 220 of FIG. 2) at the subject vehicle 10 and generating a real time image on the display 102 of the local computing system 101. An augmented reality portion 106 is generated on the display 102 and highlights a static feature 12 of the subject vehicle 10. In the particular example shown, the static feature 12 is a rear left tail light of the subject vehicle 10, but it is to be understood that the static feature 12 could be any feature of the subject vehicle 10. The augmented reality portion 106 is generated to include a border 108 that may take the outline of the static feature 12 so as to indicate an orientation and location of the local computing system 101 so as to capture an image of the static feature 12 that may be used by the vehicle certification system 200 in order to verify that the static feature 12 is in a satisfactory and/or certifiable state. That is, capturing image data of the static feature 12 with the local computing system 101 may enable the vehicle certification system 200 to certify that the static feature 12 of the subject vehicle 10 is satisfactory and/or certifiable.

The border 108 may be generated based on the shape of one or more features of vehicles using a pattern recognition or object recognition algorithm as described in greater detail herein. The border 108 may take a specific shape based on particular features of a specific make, model, class, or other vehicle classification or may take a general shape based on the type of static feature 12 that is to be imaged. The border 108 may serve as an indication to the user of the vehicle certification system 200 where to place the local computing system 101 to best image the static feature 12. As the user of the local computing system 101 progresses through an inspection of the subject vehicle 10, the shape, design, aspect, shading, or some other visual characteristic of the border 108 and/or the augmented reality portion 106 may change as will be described in greater detail herein. As the user of the local computing system 101 progresses through an inspection of the subject vehicle 10, the relative location of the border 108 and the augmented reality portion 106 on the display 102 may change as will be described in greater detail herein.

In some embodiments, the vehicle certification system 200 may automatically generate image data (e.g., capture an image) when the border 108 matches the particular static feature 12 to be imaged. That is, when one or more aspects of the border 108 (e.g., shape, size, etc.) match corresponding aspects of the static feature 12, the vehicle certification system 200 may automatically generate an image. For example, referring to FIG. 1, when the user moves the local computing system 101 such that the border 108 is over the rear left tail light of the subject vehicle 10, the local computing system may automatically activate the camera to capture an image of the rear left tail light. The vehicle certification system 200 may recognize when the border 108 is aligned with a particular static feature 12 based on image or pattern recognition algorithms as described herein. In some embodiments, the user may manually cause the local computing system 101 to capture image data of the subject vehicle 10. For example, when the border 108 surrounds the rear left tail light, the user may capture image data.

The image data may be received by the local computing system 101, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

Figure 3A:
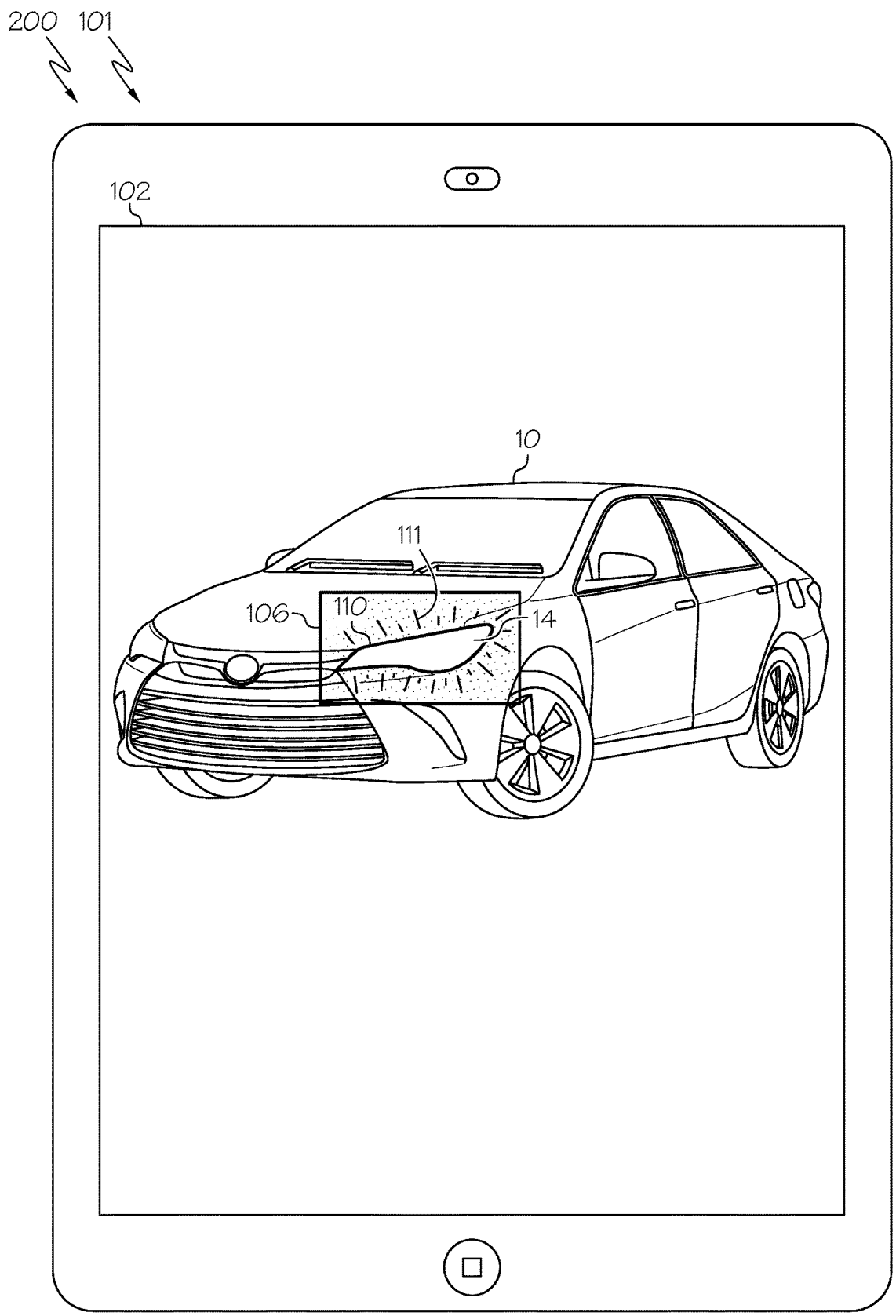
FIG. 3A depicts an example image of an inspection feature of a subject vehicle according to one or more embodiments shown and described herein.
Figure 3B:
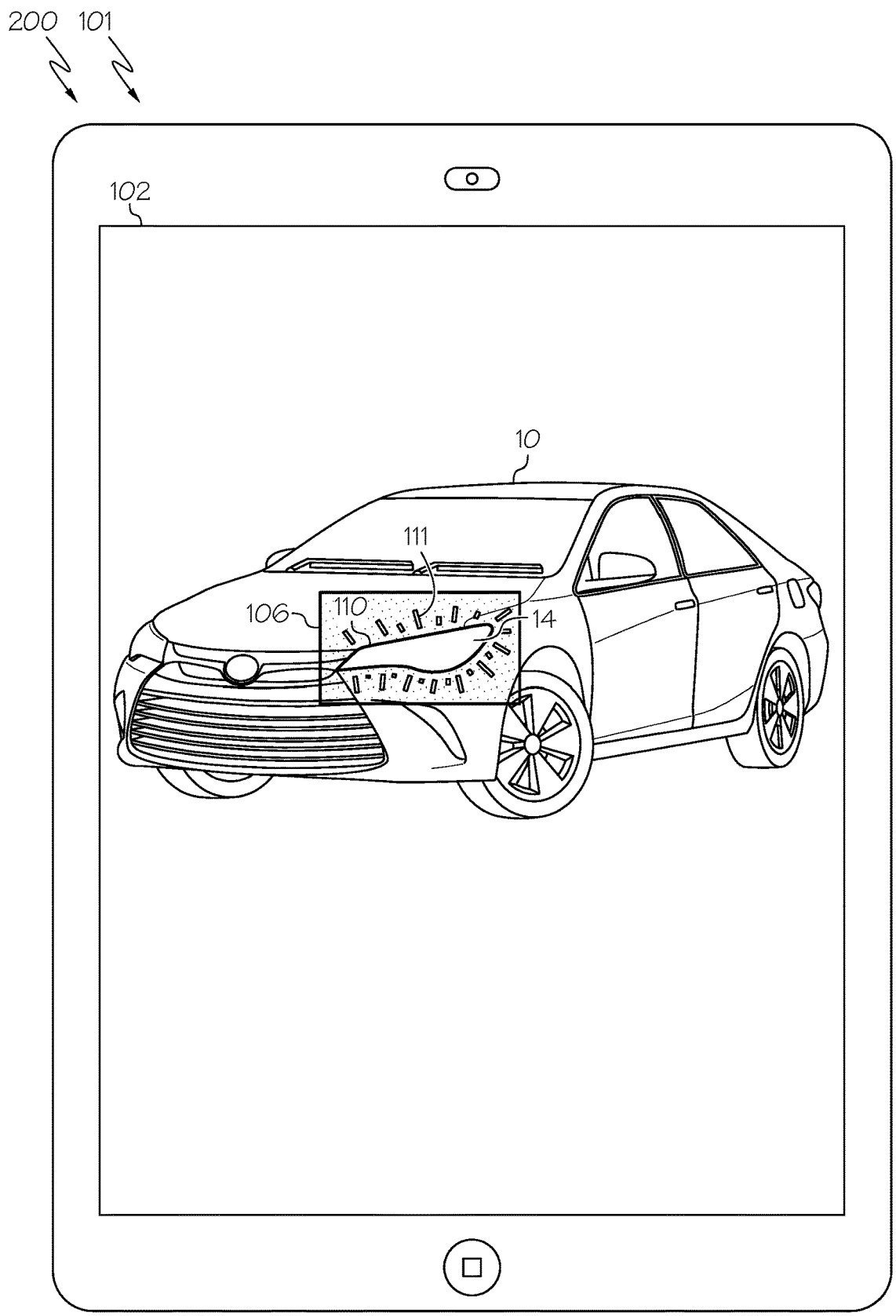
FIG. 3B depicts an example image of an augmented reality portion generated by an augmented reality system that is overlaid over the inspection feature of FIG. 3A according to one or more embodiments shown and described herein.

Referring now to FIGS. 3A and 3B, a particular aspect of a vehicle certification system 200 is shown. FIG. 3A shows the vehicle certification system 200 used to inspect a dynamic feature 14 (in this instance, the front left headlight) of the subject vehicle 10. As shown in FIG. 3A, the augmented reality portion 106 may surround the front left headlight to indicate that the front left headlight is to be tested. In the example scenario depicted in FIGS. 3A and 3B, the aspect to be tested is whether or not the front left headlight light can shift from a dim status to a bright status. A dynamic border 110 is generated within the augmented reality portion 106 to convey the appropriate aim and orientation of a camera of the local computing system 101. That is, a user of the local computing system 101 must aim a camera or other imaging device in the local computing system 101 at that angle such that the appropriate image data can be generated.

As shown in FIGS. 3A and 3B, the dynamic border 110 may include dynamic markers 111. The dynamic markers 111 may move, shift, change their pigment, shade, brightness, shape, thickness, or some other visual aspect based on a change in status of the dynamic feature 14 or to indicate a necessary change in the dynamic feature 14 which is to be inspected. One or more of the dynamic border 110 and the dynamic markers 111 may be dynamic graphical representations that include a changing graphical representation on a display, such as the display 102 of FIGS. 3A and 3B. FIG. 3A shows the dynamic markers 111 in a dim status which may indicate that the front left headlight should be in a dim status. The dynamic markers 111 may change from the dim status (FIG. 3A) to a bright status (FIG. 3B) to indicate to a user of the vehicle certification system 200 that image data of the left front headlight changing from a dim status to a bright status needs to be recorded and sent to a certifying entity. The dynamic markers 111 may change to a second status by lengthening, brightening, changing color, etc. to demonstrate that a user of the local computing system 101 should cause the particular dynamic feature 14 to change. FIG. 3B shows the dynamic markers 111 in a bright status and the front left headlight in a bright status.

Figure 4A:
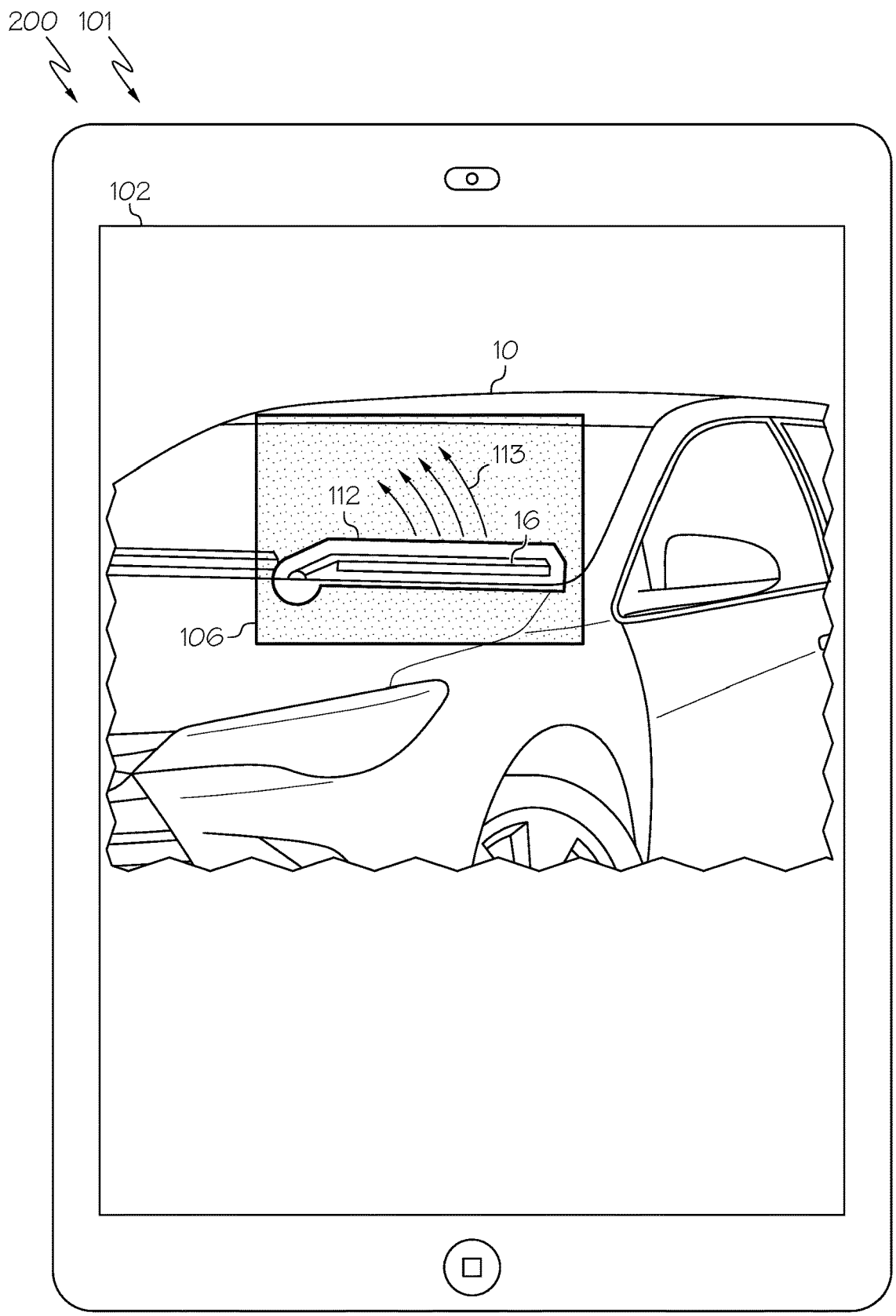
FIG. 4A depicts an example image of a dynamic inspection feature of a subject vehicle according to one or more embodiments shown and described herein.
Figure 4B:
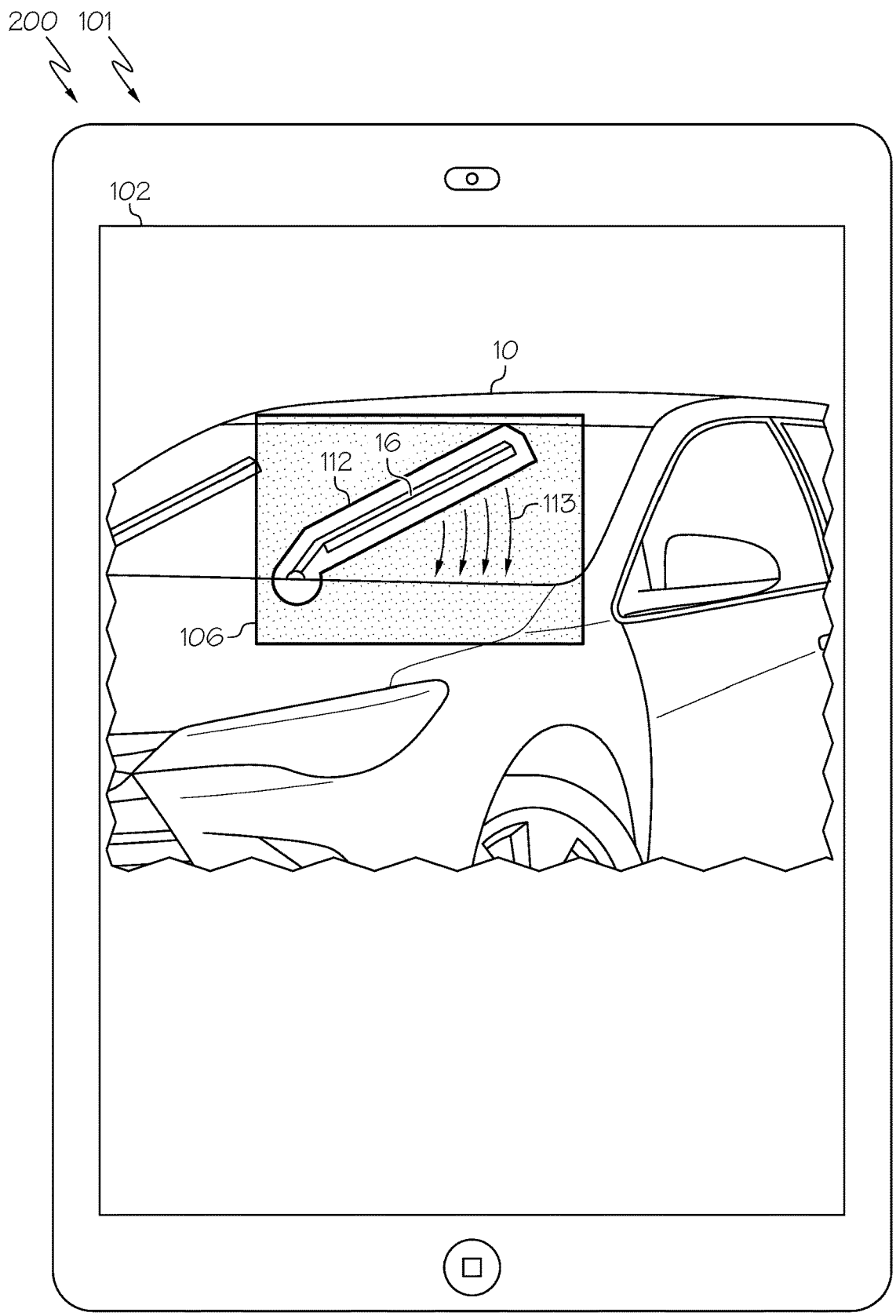
FIG. 4B depicts an example image of an augmented reality portion that is a dynamic graphical representation that is overlaid over a dynamic inspection feature according to one or more embodiments shown and described herein.

Referring now to FIGS. 4A and 4B, a second dynamic feature 16 surrounded by a second dynamic marker 112 that includes dynamic indicators 113 is shown. In this case, the second dynamic feature 16 is a windshield wiper that may move from a base position at which the wiper is substantially parallel with a plane formed by a hood of the subject vehicle 10 (FIG. 4A) to an extended position at which the wiper may be at an angle as compared to the hood of the subject vehicle 10 (FIG. 4B). Verification of the ability of the wipers to move from the base position to the extended position may be necessary, for example, to certify the subject vehicle 10 for registered operation.

The augmented reality portion 106 may include the second dynamic marker 112 that surrounds and indicates the second dynamic feature 16. The second dynamic marker 112 may be a dynamic graphical representation that may move upward and downward within the augmented reality portion 106 to indicate to a user of the vehicle certification system 200 that image data of the windshield wiper moving from the base position to the extended position needs to be recorded and sent to a certifying entity. The appearance of the dynamic indicators 113 may change based on the change of the second dynamic marker 112.

The dynamism of the dynamic graphical representations may be based in part on a vehicle inspection list. For example, one or more of the dynamic features on a vehicle inspection list (e.g., the changing of a light from dim to bright, the activation of windshield wipers, the activation of a turn signal, etc.) may be indicated with dynamic indicators. Icons and other pictographs or pictograms may be used to indicate a change in the dynamic feature. The icons and other pictographs or pictograms may be relatively simple movements or other changes intended to be readily observable and understandable by a user of the vehicle certification system 200. Accordingly, the dynamic indicators may help the user proceed through a checklist of dynamic features of an inspection or certification requirement for a vehicle such as the subject vehicle 10.

In some embodiments, the local computing system 101 is configured to tally each of the items in an inspection checklist and to generate a report as to whether the subject vehicle 10 passed each of the items. In some embodiments, a graphical user interface (GUI) may list all of the inspection list items to the user so that he or she can follow along with the inspection. Some embodiments of the GUI may enable a user to jump in between inspection list items in order to complete the inspection in a customized order. In some embodiments, a selectable list of inspection list items may appear on the display 102 or other portion of the local computing system 101 that may allow a user to select one or more inspection list items in order to selectively complete such items. Selecting an item may display information such as instructions for completing such items, example images of the augmented reality portion for such an item which may include an image of the border and any dynamic features of the augmented reality portion, as well as other information.

Figure 5:
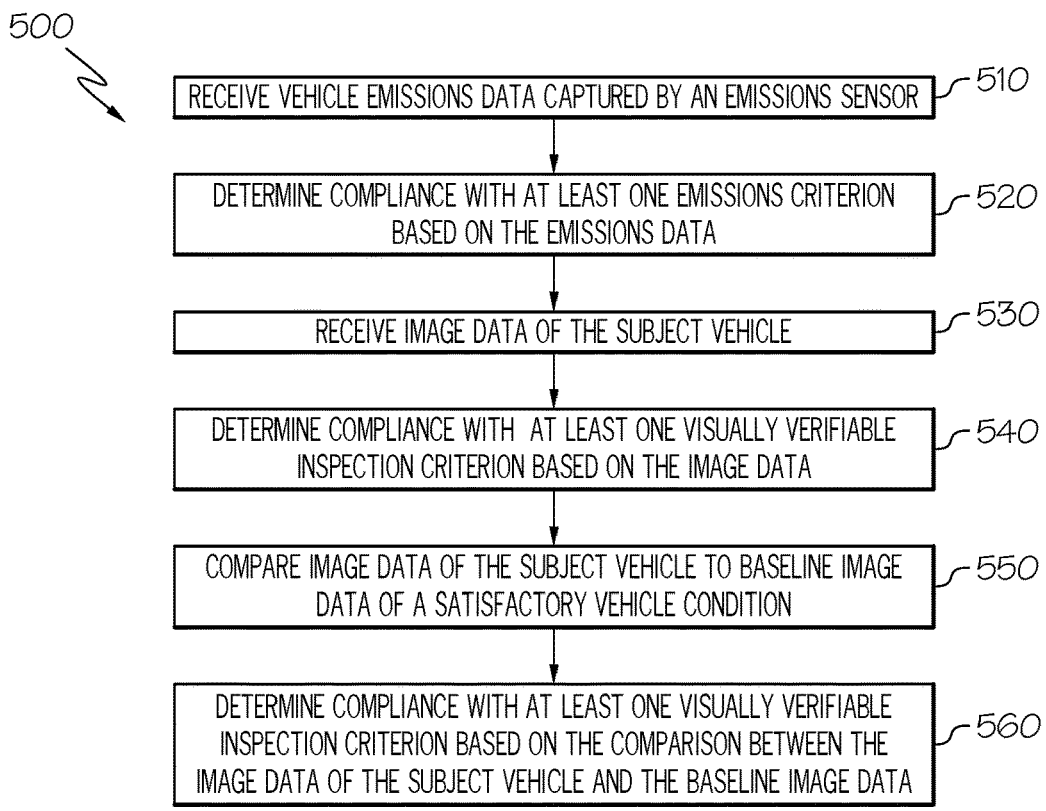
FIG. 5 depicts a flowchart of an example method for inspecting a subject vehicle using an augmented reality inspection system according to one or more embodiments shown and described herein.
Figure 6:
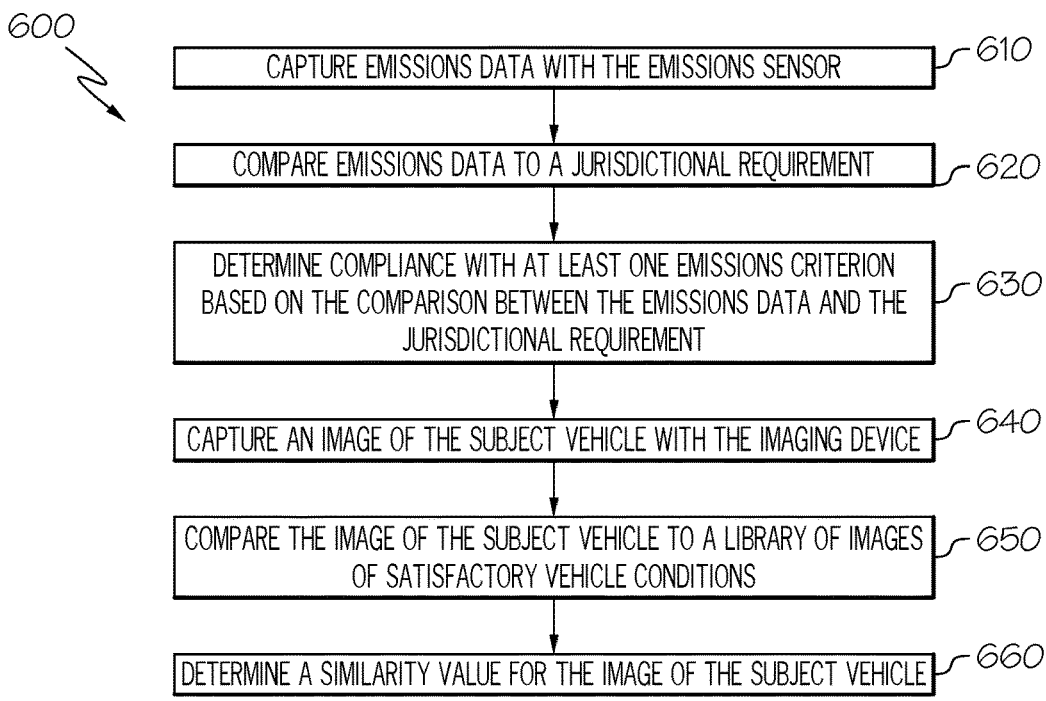
FIG. 6 depicts a flowchart of another example method for inspecting a vehicle using an augmented reality inspection system according to one or more embodiments shown and described herein.

Referring now to FIGS. 5 and 6, flowchart 500 and flowchart 600 depict example methods implemented in the AR logic of the vehicle certification system 200. Referring first to FIG. 5, at block 510 of the flowchart 500, the vehicle certification system 200 may receive emissions data captured by an emissions sensor or another system of the subject vehicle 10. The vehicle emissions data may be an input to the emissions testing module 222. In some embodiments, the emissions data may include data regarding one or more of a $CO$, $CO_2$, $H_2O$, or other chemical constituent or ratio thereof. In some embodiments, the vehicle emissions data is based upon an input from a vehicle system such as an engine monitoring system or a fuel monitoring system.

At block 520, the vehicle certification system 200 may compare the emissions data to emissions standards to determine compliance with at least one emissions criterion. The emissions standards may be saved as data in, for example, the non-transitory computer readable memory. The emissions standards may be saved in a lookup table in the non-transitory computer readable memory, for example. In some embodiments, the emissions standards are variable based on a vehicle make, model, type, year-model, and/or class and the emissions data from the subject vehicle 10 may be compared to the correct standard based on the make, model, type, year-model, and/or class of the subject vehicle 10. In some embodiments, the emissions standards may be stored externally from the vehicle certification system 200 and may be delivered to/from the vehicle certification system 200 via the network interface hardware 234. In some embodiments, the emissions standards are periodically updated by a certifying jurisdiction or other entity and the non-transitory computer readable memory may be updated accordingly if the emissions standards are stored there.

At block 530, the vehicle certification system 200 may receive image data of the subject vehicle 10 or a portion thereof using the imaging device 220. The image data may be stored in the data storage component until it is processed by the vehicle certification system 200. In some embodiments, the image data may be automatically processed in real-time or near-real time so that an inspector may utilize the vehicle certification system 200 while actively inspecting the subject vehicle 10. In some embodiments, the user of the vehicle certification system 200 may be aided in the capture of data by the augmented reality portion as described in greater detail herein. That is, one or more augmented reality portions 106 including static or dynamic graphical representations may be displayed simultaneously with the image data of the subject vehicle 10 to guide the user through the process of capturing image data of the subject vehicle 10. Features of the static and dynamic graphical representations within the augmented reality portion such as the brightness, movement, color, shape, etc. may be determined by the make, model, class, type, and/or trim package of the subject vehicle 10. In embodiments where the make, model, and/or trim package of a subject vehicle is identified the vehicle certification system 200 may base one or more features of the static or dynamic graphical representations on a sub-group of the library of images of satisfactory vehicle conditions that correspond to the particular make, model, and/or trim package of the subject vehicle 10. The sub-group of the library of images of satisfactory vehicle conditions may reduce the set of images the system may need to analyze when generating a static or dynamic graphical representation in the augmented reality portion 106 or when comparing and determining whether an image of the subject vehicle 10 matches a satisfactory vehicle condition.

At block 540, the vehicle certification system 200 may determine compliance with at least one visually verifiable vehicle inspection criterion based on the image data of the subject vehicle 10. The visually verifiable inspection criterion may include, for example, a component integrity (e.g., an integrity of a left taillight), or the ability of a component to properly function (e.g., a properly functioning headlight or windshield wiper), or some other visually verifiable inspection criterion. In some embodiments, the visually verifiable inspection criterion may be based on a make, model, style, class, year-model and/or trim package of the subject vehicle 10. For example, in vehicles having a trailer hitch or other mechanism for towing, such component may be added to the list of items to be inspected. Various vehicle features may be recognized during an inspection and added to the list of items to be inspected during the inspection as the imaging device 220 is used to inspect the subject vehicle 10. Additionally, identification of the visually verifiable inspection criterion may be accomplished through an alphanumeric input of the vehicle identification number (VIN) into the system, through capturing a picture of the VIN (e.g., the VIN barcode) with the imaging device 220, through image recognition whereby the imaging device 220 captures one or more images of the subject vehicle that include identifying features or tags (e.g., the license plate), or any other means of identification.

At block 550, the vehicle certification system 200 may compare image data of the subject vehicle to baseline image data of a satisfactory condition. In some embodiments, the image comparison algorithm that is implemented may logically compare the image data of the subject vehicle 10 or portion thereof to one or more images within the library of images of satisfactory vehicle conditions. However, in some embodiments, a sub-group of images may be selected in the case where the make, model, trim package, and/or other classifications such as the type of vehicle (e.g., sedan, sports utility vehicle, and truck) may be known or input into the system. Furthermore, where the image comparison step implements a machine learning data structure such as a deep belief network for comparing and determining whether the image data of the subject vehicle matches a satisfactory vehicle condition, it may not be necessary to reduce the library of images of satisfactory vehicle conditions since the machine learning algorithm may be trained to determine similarities and difference in images for multiple vehicle types, makes, models, year-models, and/or trim packages.

At block 560, the vehicle certification system 200 may determine compliance with at least one visually verifiable inspection criterion based on the comparison between the image data of the subject vehicle 10 and the baseline image data. In the event the image data of the portion of the subject vehicle includes a satisfactory vehicle condition, the vehicle certification system 200 may provide an indication such as a green highlighted portion over the image of the subject vehicle or other approval indication and may further proceed with receiving and analyzing additional image data captured by the camera of other portions of the subject vehicle 10. In some embodiments, when a feature within the image data of the subject vehicle 10 does not match (i.e., determined to be non-compliant) with a satisfactory vehicle condition, the vehicle certification system 200 may present on the display device an augmented reality overlay indicating the portion of the vehicle that does not comply with a satisfactory vehicle condition. For example, a first highlighted portion of the image data of the portion of the subject vehicle that includes the non-compliant feature and/or component may be generated and displayed as an augmented reality overlay with the image data so that an inspector (i.e., a user) may view both the portion of the subject vehicle and the highlighted portion that requires further inspection.

Referring now to FIG. 6, the flowchart 600 depicts an example method that may be implemented by an augmented reality system such as the local computing system 101 using, for example, the AR logic 244. At block 610, the local computing system 101 may capture emissions data with an emissions sensor. The vehicle emissions data may be an input to the emissions testing module 222. In some embodiments, the emissions data may include data regarding one or more of a CO, $CO_2$, $H_2O$, or other chemical constituent or ratio thereof. In some embodiments, the vehicle emissions data is based upon an input from a vehicle system such as an engine monitoring system or a fuel monitoring system.

At block 620, the local computing system 101 or other computing device may compare the emissions data to a jurisdictional requirement. The emissions standards may be saved as data in, for example, the non-transitory computer readable memory. Jurisdictional requirements may be saved, for example, in a lookup table in the non-transitory computer readable memory. In some embodiments, the emissions standards are variable based on a vehicle make, model, type, or class and the emissions data from the subject vehicle 10 may be compared to the correct standard based on the make, model, type, or class of the subject vehicle 10. In some embodiments, the emissions standards may be stored externally and may be delivered to/from the local computing system 101 via the network interface hardware 234. In some embodiments, the emissions standards are periodically updated by a certifying jurisdiction or other entity and the non-transitory computer readable memory may be updated accordingly if the emissions standards are stored there.

At block 630, the local computing system 101 or some other processing device may determine compliance with at least one emissions criterion based on the comparison between the emissions data and the jurisdictional requirement. In some embodiments, the determination of compliance for the emissions standard may occur simultaneously or after a visual inspection. If the subject vehicle 10 is determined to satisfy vehicle emissions requirements of a particular jurisdiction, the display 102 of the local computing system 101 may indicate a passing grade or other indication to notify a user of the system that the subject vehicle 10 meets requirements.

At block 640, an image may be captured of the subject vehicle 10 using the imaging device 220. The image data may be used to identify a vehicle make, model, class, type, and/or trim package of the subject vehicle 10, such as, for example, by using an image recognition algorithm. In other embodiments, identification of the vehicle may be accomplished through input of the vehicle identification number (VIN) into the vehicle certification system 200 (e.g., using the input/output hardware 232), through capturing a picture of the VIN with the imaging device 220, through image recognition whereby the imaging device 220 captures one or more images of the subject vehicle 10 that include identifying features or tags (e.g., the license plate), or any other means of identification. Portions of the subject vehicle 10 may include views from outside the subject vehicle 10, of specific static and dynamic features, and the like. In some embodiments, the image data may be stored in the data storage component 236 until it is processed by the vehicle certification system 200. In some embodiments, the image data may be processed in real-time or near-real time so that an inspector may utilize the vehicle certification system 200 while actively inspecting the subject vehicle 10. For example, the vehicle certification system 200 may provide augmented display overlays on the live images being viewed by the inspector through the display device.

At block 650, the image data of the portion of the subject vehicle 10 is compared to a library of images of satisfactory vehicle conditions. In some embodiments, the image comparison algorithm that is implemented may logically compare the image data of the portion of the subject vehicle 10 to multiple images within the library of images of satisfactory vehicle conditions. However, in some embodiments, a sub-group of images may be selected in the case where the make, model, trim package, and/or other classifications such as the type of vehicle (e.g., sedan, sports utility vehicle, and truck) may be known or input into the system. Furthermore, where the image comparison step implements a machine learning data structure such as a deep belief network for comparing and determining whether the image data of the subject vehicle 10 matches a satisfactory vehicle condition, it may not be necessary to reduce the library of images of satisfactory vehicle conditions since the machine learning algorithm may be trained to determine similarities and difference in images for multiple vehicle types, makes, models, and/or trim packages.

At block 660, the image comparison technique employed by the system may further determine a similarity value for a portion of the image data of the subject vehicle 10 as it relates to a satisfactory vehicle condition. That is, in some embodiments, the comparison between a portion of the image data of the subject vehicle 10 and the satisfactory vehicle conditions may be scored, for example, from 0 to 100, based on how similar the portion of the image data of the subject vehicle 10 is determined to be with a satisfactory vehicle condition. The image data may be scored with a similarity value based on the entire image or multiple similarity values may be determined for predefined portions of the image data of the subject vehicle 10. For example, the image data of the subject vehicle 10 may be defined by a grid space where each cell of the gird space is assigned a numeric similarity score based on how similar the image data of the subject vehicle 10 within that cell is to a satisfactory vehicle condition. In other embodiments, that image data may be defined through object detection and segmentation where independent components within the image data of the subject vehicle 10 are assigned similarity values.

The determination of similarity values for portions of the image data may provide an inspector additional confidence and/or detail when inspecting the subject vehicle 10. For example, differences between a subject vehicle 10 and the satisfactory vehicle conditions may arise due to wear and tear of the vehicle, images of components captured from angles or distances that are different from those that make up the library of images of satisfactory vehicle conditions, differences in lighting, or the like. These variations may contribute to the dissimilarity of portions of the subject vehicle 10 when compared to satisfactory vehicle conditions.

In some embodiments, the vehicle certification system 200 may determine whether or not the similarity value is above a similarity value threshold. Based on the determination of whether or not the similarity value is above the similarity value threshold, the vehicle certification system 200 may request detailed image data about the particular visually verifiable feature. In some embodiments, more detailed image data may be captured based on the similarity value. That is, if the similarity value is below a similarity value threshold, the vehicle certification system 200 may automatically prompt a user to capture a more detailed image. For example, a zoomed-in image, an image of a specific component in an assembly, an image with increased contrast, and the like. The detailed image data may be used to verify the inspection criterion. For example, if background lighting is too high, it may be difficult for a vehicle certification system 200 to determine whether or not a turn signal is flashing on and off or not. In such an instance, the vehicle certification system 200 may request more detailed image data to make a determination of whether the turn signal is working or not. The vehicle certification system 200 may request that the user change the angle of the imaging device 220 or change the background lighting by moving the subject vehicle 10 to a different location, etc. In some embodiments, the vehicle certification system 200 may compare the more detailed image data to the library of images of satisfactory vehicle conditions.

It should now be understood that a vehicle certification system may include one or more sensors for capturing emissions data and one or more imaging devices for capturing image data. The emissions data and the image data may be used to test the subject vehicle against the emissions and physical inspection criteria of a jurisdiction in order to verify that the subject vehicle is within jurisdictional standards. Embodiments described herein include vehicle certification systems that augment a display of a local computing system with an augmented reality portion that may indicate to a user a static or dynamic feature that needs to be inspected per the jurisdiction's requirements. The augmented reality portion may include, for example, a border or other indicator that indicates to the user which feature on the subject vehicle is to be inspected. Various borders and other graphics may be displayed using the vehicle certification system to guide a user through a visual inspection. Combining the emissions inspection with the visual inspection may save user's time and expense as well as result in increased accuracy in vehicle inspections.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle certification system configured to:
   receive the emissions data of a subject vehicle captured by an emissions sensor;
   determine compliance with at least one emissions criterion based on the emissions data;
   display an augmented reality portion on a display, wherein the augmented reality portion comprises a dynamic border around an outline of a dynamic inspection feature of the subject vehicle to indicate to a user where to place a computing system to best image the dynamic inspection feature, wherein the dynamic border includes dynamic markers that change to indicate a necessary change in the dynamic inspection feature;
   capture image data of the dynamic inspection feature when the dynamic border on the augmented reality portion is aligned with the dynamic inspection feature;
   receive the image data of the dynamic inspection feature; and
   determine whether one or more physical parameters of the dynamic inspection feature satisfy a requirement for passing a certification test based on the image data.

2. The vehicle certification system of claim 1, further configured to:
   compare the image data of the dynamic inspection feature to baseline image data of a satisfactory vehicle condition, and determine whether the one or more physical parameters of the dynamic inspection feature satisfy the requirement for passing the certification test based on the comparison between the image data and the baseline image data.

3. The vehicle certification system of claim 2, further comprising:
an emissions sensor configured to capture the emissions data of the subject vehicle; and
a local computing system comprising:
a processor and a non-transitory computer readable memory;
an imaging device communicatively coupled to the processor;
a display communicatively coupled to the processor; and
a machine-readable instruction set stored in the non-transitory computer readable memory that, when executed by the processor, causes the local computing system to capture the image data of the dynamic inspection feature,
wherein a real time image is displayed on the display that is based on the image data captured by the imaging device.

4. The vehicle certification system of claim 3, wherein the augmented reality portion is a display overlay that overlays simultaneously with the real time image on the display and is configured to identify one or more inspection features on the subject vehicle.

5. The vehicle certification system of claim 4, wherein the augmented reality portion is a semi-transparent display overlay that can align with the one or more inspection features as displayed on the display.

6. The vehicle certification system of claim 5, wherein the augmented reality portion is a dynamic graphical representation that indicates an inspection feature.

7. The vehicle certification system of claim 5, wherein the vehicle certification system is further configured to:
identify one or more of a make, a model, or a trim package of the subject vehicle;
select a sub-group of baseline image data based on one or more of the make, the model, or the trim package of the subject vehicle;
compare the image data of the inspection feature to the sub-group of baseline image data; and
determine whether the one or more physical parameters of the inspection feature satisfy the requirement for passing the certification test based on the comparison between the image data of the inspection feature and the sub-group of baseline image data.

8. The vehicle certification system of claim 7, wherein a shape of the augmented reality portion is based on the baseline image data or the sub-group of baseline image data.

9. The vehicle certification system of claim 7, wherein identifying at least one of the make, the model, or the trim package of the subject vehicle includes receiving a VIN of the subject vehicle.

10. The vehicle certification system of claim 3, wherein the machine-readable instruction set, when executed, further causes a satisfactory inspection indication to be displayed on the display based on a determination that the one or more physical parameters of the dynamic inspection feature have satisfied the requirement for passing the certification test.

11. An augmented reality system configured to:
capture an image of a subject vehicle with an imaging device;
present on a display the image captured by the imaging device;
present on the display an augmented reality portion, wherein the augmented reality portion is a display overlay that overlays simultaneously with the image on the display and comprises a dynamic border around an outline of a dynamic inspection feature on the subject vehicle to be inspected as part of a certification test of the subject vehicle, wherein the dynamic border includes dynamic markers that change to indicate a necessary change in the dynamic inspection feature; and
capture image data of the dynamic inspection feature when the dynamic border on the augmented reality portion is aligned with the dynamic inspection feature.

12. The augmented reality system of claim 11, further configured to:
compare the image of the subject vehicle to a library of images of satisfactory vehicle conditions; and
determine a similarity value for the image of the subject vehicle, wherein the similarity value defines a similarity between the image of the subject vehicle and one or more images in the library of images of satisfactory vehicle conditions.

13. The augmented reality system of claim 12, further configured to:
identify one or more of a make, a model, or a trim package of the subject vehicle; and
select a sub-group of images from the library of images of satisfactory vehicle conditions based on one or more of the make, the model, or the trim package of the subject vehicle, wherein
the image of the subject vehicle is compared to the sub-group of images from the library of images of satisfactory vehicle conditions.

14. The augmented reality system of claim 13, wherein a shape of the augmented reality portion is based on the sub-group of images from the library of images of satisfactory vehicle conditions.

15. The augmented reality system of claim 13, wherein identifying one or more of the make, the model, or the trim package of the subject vehicle includes receiving a VIN of the subject vehicle.

16. The augmented reality system of claim 11, wherein one or more of a processor, the imaging device, the display, and a non-transitory computer readable memory are contained in a local computing system.

17. A method comprising:
displaying an augmented reality portion on a display, wherein the augmented reality portion comprises a dynamic border around an outline of a dynamic inspection feature of a subject vehicle to indicate to a user where to place a computing system to best image the dynamic inspection feature, wherein the dynamic border includes dynamic markers that change to indicate a necessary change in the dynamic inspection feature;
capturing image data of the dynamic inspection feature when the dynamic border on the augmented reality portion is aligned with the dynamic inspection feature; and
transmitting emissions data associated with the subject vehicle and the image data to a remote server.

18. The method of claim 17 further comprising
determining whether the subject vehicle has satisfied at least one emissions criterion based on the emissions data;
comparing the image data of the dynamic inspection feature to baseline image data of a satisfactory vehicle condition, and determining whether one or more physical parameters of the dynamic inspection feature satisfy a requirement for passing a certification test based on a comparison between the image data and the baseline image data.

19. The method of claim 18, wherein the augmented reality portion is a display overlay that overlays simultaneously with an image on the display and is configured to identify one or more inspection features on the subject vehicle.

* * * * *